United States Patent [19]

Arika et al.

[11] 4,157,379

[45] Jun. 5, 1979

[54] PROCESS FOR PRODUCING CHAIN STRUCTURED CORPUSCULAR CALCIUM CARBONATE

[75] Inventors: Junji Arika; Masaru Takitani; Keiji Mitarai; Kazuaki Yamamoto, all of Shin-nanyo, Japan

[73] Assignee: Toyo Soda Manufacturing Co., Ltd., Yamaguchi, Japan

[21] Appl. No.: 856,114

[22] Filed: Nov. 30, 1977

Related U.S. Application Data

[63] Continuation-in-part of Ser. No. 786,190, Apr. 11, 1977, abandoned.

[51] Int. Cl.$^2$ .............................................. C01F 11/18
[52] U.S. Cl. ..................................... 423/430; 423/432
[58] Field of Search ................................. 423/430, 432

[56] References Cited

U.S. PATENT DOCUMENTS

| 3,126,253 | 3/1964 | Podschus | 423/432 |
| 3,347,624 | 10/1967 | Taylor | 423/432 |
| 4,018,877 | 4/1977 | Woods | 423/432 |

FOREIGN PATENT DOCUMENTS

| 46-12922 | 3/1971 | Japan | 423/432 |
| 46-14821 | 4/1971 | Japan | 423/430 |

*Primary Examiner*—G. O. Peters
*Attorney, Agent, or Firm*—Oblon, Fisher, Spivak, McClelland & Maier

[57] ABSTRACT

Chain structured corpuscular calcium carbonate is produced by a carbonation of calcium hydroxide suspended in water in the presence of a chelating agent and a water soluble metal salt.

8 Claims, 6 Drawing Figures

(× 45,000)

(× 45,000)

(× 45,000)

(× 45,000)

(×45,000)

(×45,000)

PROCESS FOR PRODUCING CHAIN STRUCTURED CORPUSCULAR CALCIUM CARBONATE

This application is a continuation-in-part of application Ser. No. 786,190, filed Apr. 11, 1977 now abandoned.

BACKGROUND OF THE INVENTION

1. Field of the Invention

The present invention relates to a process for producing chain structured corpuscular calcium carbonate. More particularly, it relates to a process for producing chain structured corpuscular calcium carbonate having an average diameter of 0.01 to $0.1\mu$ as primary particles and an average aspect ratio of 5 to 50.

2. Description of the Prior Art

Heretofore, the production of fine calcium carbonate by carbonation of calcium hydroxide has been carried out by introducing carbon dioxide into an aqueous suspension of calcium hydroxide.

In the conventional process for producing fine calcium carbonate, when carbon dioxide is continuously introduced into the aqueous suspension of calcium hydroxide, the viscosity of the suspension is gradually increased depending upon the progress of the carbonation. When 30 to 50% of the carbonation is performed, the viscosity of the suspension reaches to the maximum to cause viscous colloidal slurry by the formation of high molecular basic calcium carbonate. When the carbonation is further continued the viscosity is decreased to result a suspension having low viscosity as the original suspension. When the carbonation is further continued to the end point of the carbonation reaching the pH of the suspension to 7 to 8, the resulting suspension is filtered and the resulting mass is dried and pulverized.

The resulting fine calcium carbonate has been used as fillers for reinforcing rubber or plastics etc. It has been known that the reinforcing effect is higher depending upon reducing the diameter of the particles of fine calcium carbonate. However, the filler such as a special fine calcium carbonate having cubic shape has high mutual cohesive force between particles whereby the particles are distributed as aggregates in the kneading of the particles to the rubber or the plastics. It is difficult to disperse the particles as the primary particles.

Thus, the fine filler such as special fine calcium carbonate having cubic shape could not be uniformly dispersed into the rubber or the plastics, it has not been attained the expected reinforcing effect for the rubber or the plastics, disadvantageously.

On the other hand, chain structured fine calcium carbonate has the configuration developing to longitudinal direction by bonding primary particles in chain whereby the phenomenon of aggregation as it is found for the primary particles can be prevented whereby the dispersing property to the rubber or the plastics can be advantageously improved.

Moreover, when the chain structured corpuscular calcium carbonate is dispersed into the rubber or the plastics, the reinforcing effect for the rubber or the plastics could advantageously be improved because of the resulting steric structure. From these viewpoints, it has been desired to develop the production of chain structured corpuscular calcium carbonate having high aspect ratio.

For producing chain structured fine calcium carbonate, the following process has been known; the carbonation is carried out by introducing carbon dioxide gas into the aqueous suspension of calcium hydroxide and a water soluble sulfate, a zinc salt or a magnesium salt is added as an additive when the carbonation is performed to give the viscous colloidal suspension. However, only the aforementioned special additives have been effective and it has not been clear whether sulfates except sodium, potassium, lithium, aluminum, ammonium and ferrous sulfates could be effective or not. The additives which could be used have been limited.

Moreover, the aspect ratio of the chain structured fine calcium carbonate has been up to only about several and it has been impossible to obtain the chain structured corpuscular calcium carbonate having an aspect ratio of such as several tens. Furthermore, in order to complete the chain formation it has been needed to keep the resulting suspension in ageing for 1 to 7 days after the carbonation. These disadvantages have been found.

The inventors have studied to overcome the disadvantages and to attain the demands and the invention has been attained.

SUMMARY OF THE INVENTION

It is an object of the present invention to provide a process for producing chain structured corpuscular calcium carbonate having high aspect ratio without ageing.

The foregoing and other objects of the present invention can be attained by providing a process for producing chain structured corpuscular calcium carbonate having an average diameter of 0.01 to $0.1\mu$ as primary particles and an average aspect ratio of 5 to 50 by a carbonation introducing carbon dioxide gas into an aqueous suspension of calcium hydroxide in the presence of a chelating agent and a water soluble metal salt.

In the specification, the aspect ratio means ratio of length to diameter of chain structured calcium carbonate.

DETAILED DESCRIPTION OF THE PREFERRED EMBODIMENTS

Figure 1:

The time for adding the additives of the chelating agent and the water soluble metal salt and the time for the carbonation of calcium hydroxide suspended in water are preferably as follows.

The chelating agent is first added to an aqueous suspension of calcium hydroxide and carbon dioxide gas is introduced into the suspension of calcium hydroxide. When the resulting suspension becomes viscous colloid by the formation of high molecular basic calcium carbonate in the carbonation, the water soluble metal salt in the form of solid or aqueous solution is added to the suspension. Then, the carbonation is continued to give the pH of the suspension to 7 to 8.

As an alternative procedure, the chelating agent and the water soluble metal salt are simultaneously or separately added to the suspension of calcium hydroxide and the carbonation is initiated and is continued to give the pH of the suspension to 7 to 8. However, the one step process is not always to be satisfactory so as to attain the purpose of the reaction.

It is essential to exist both of the chelating agent and the water soluble metal salt in the carbonation. The object of the present invention can not be attained with using only one of them.

Even though the chain structured fine calcium carbonate could be obtained by adding one of the additives, it is difficult to obtain the object chain structured corpuscular calcium carbonate having an average aspect ratio of 5 to 50 and the resulting calcium carbonate comprises primary particles having large diameter.

Accordingly, the carbonation is carried out in the presence of the chelating agent and the water soluble metal salt in the invention, and the skill and experienced technique required for the conventional processes are not needed and the uniform chain structured corpuscular calcium carbonate can be easily obtained without failure.

The other feature of the present invention is to obtain the chain structured corpuscular calcium carbonate without the ageing of the resulting suspension which has been required in the conventional processes after the carbonation.

The invention will be further illustrated by the example that the carbonation is initiated after adding the chelating agent to the aqueous suspension of calcium hydroxide and the water soluble metal salt is added at the time that the suspension becomes the viscous colloidal suspension in the carbonation and the carbonation is further continued.

The chelating agents used in the present invention mean organic compounds which coordinate to a metal ion to form a metal chelate compound having multidentate ligand. The chelating agent affects to form finely divided (corpuscular) primary particles of calcium carbonate and to easily result the following chain formation.

Suitable chelating agents include aliphatic carboxylic acids such as oxalic acid, maleic acid and tricarballylic acid; oxy- or ketocarboxylic acids such as glycolic acid, citric acid and pyruvic acid; thiocarboxylic acids such as thiomalic acid and thioglycolic acid; aromatic carboxylic acids or aldehydes such as trimellitic acid, pyromellitic acid and salicylaldehyde; aromatic sulfonic acids such as chromotropic acid and tiron; aminopolycarboxylic acids such as iminodiacetic acid, nitrilotriacetic acid, ethylenediamine diacetic acid, hydroxyethyl ethylenediamine tetraacetic acid and ethylenediamine tetraacetic acid; amino acids or proteins such as glutamic acid, aspartic acid, albumin, gelation and carboxypeptitase; purine bases or nucleosides such as purine and flavin mononucleoside; antibiotics such as penicillin; metallochromic indicators such as Eriochrome Black; oximes and diketones such as dimethyl glyoxime, methyloxime and acetylacetone; amines such as triethanol amine and hydroxyethyl amine; and alkali metal salts thereof.

A chelating agent-containing calcium hydroxide suspension can be prepared by suspending calcium hydroxide in an aqueous solution prepared by dissolving one or more chelating agent in water.

The concentration of calcium hydroxide in the suspension is preferably in a range of 1 to 20 wt.%. When it is lower than 1 wt.%, the viscosity change in the carbonation is not easily found because of low concentration and accordingly, it is difficult to find the time suitable for the addition of the water soluble metal salt. On the other hand, when it is higher than 20 wt.%, the viscosity of the suspension is too high and accordingly, it is difficult to attain the stirring and the removing the reaction heat.

The amount of the chelating agent to be added is in a range of 0.1–20 wt. parts per 100 wt. parts of calcium hydroxide. When it is less than 0.1 wt. part, the chain formation is not completely resulted and calcium carbonate having large average diameter of primary particles are formed. When more than 20 wt. parts of the chelating agent is used, the primary particles of calcium carbonate is remarkably fine, but the agglomerated cake is disadvantageously obtained.

It is necessary to maintain the calcium hydroxide suspension and the resulting suspension at 0° to 30° C. with throughly stirring until the completion of the carbonation.

When it is maintained at 0° to 30° C., the chain structured corpuscular calcium carbonate having 0.01 to $0.1\mu$ of an average diameter of primary particles can be attained. On the contrary, when it is higher than 30° C., individual coarse calcium carbonate crystals having more than $0.1\mu$ of an average diameter are obtained with failure and the chain structured configuration is too hard to be attained.

The carbonation is preferably carried out by two steps of the primary carbonation for forming a viscous colloidal suspension by introducing carbon dioxide gas into the suspension of calcium hydroxide and the secondary carbonation by adding the water soluble metal salt after the primary carbonation and then introducing carbon dioxide gas into it, to give the pH to 7 to 8.

The concentration of carbon dioxide in the carbonation is not critical, and thus it is especially effective to use 10 to 80 vol.% of carbon dioxide gas diluted with an inert gas.

The water soluble metal salts adding after the primary carbonation is changed to water insoluble precipitate in an aqueous suspension of calcium hydroxide and it is selected from the group consisting of alkali metal sulfates, alkali metal phosphates and water soluble metal salts of various metal elements in the copper group, alkaline earth metal group except calcium, zinc group, rare earth group, boron group, titanium group, carbon group, vanadium group, nitrogen group, chromium group, oxygen group, manganese group, iron group, platinum group, lanthanum group and actinium group.

It is not clear the reason why said water soluble metal salts affect to the chain formation. Thus, it is considered that said water soluble metal salts impart the property of bonding primary particles of the finely divided calcium carbonate by the effect of the chelating agent, with the water insoluble metal hydroxide or the water insoluble calcium salts except calcium carbonate which is formed by freshly precipitating from said water soluble metal salt in the aqueous suspension of calcium hydroxide.

The amount of said water soluble salt is in a range of 0.0001 to 0.5 mole preferably 0.0001 to 0.2 mole per 1 mole of calcium hydroxide as the starting material. Said water soluble salt in the form of solid or aqueous solution is added to the suspension after the primary carbonation. When the amount of said water soluble salt is less than 0.0001 mole, the chain structured corpuscular calcium carbonate is not obtained but individual fine calcium carbonate having cubic shape is formed. On the other hand, when the amount of said water soluble salt is more than 0.5 mole, the primary particles are in finely divided form, however, they are agglomerated to form a cake and the chain structured corpuscular calcium carbonate can not be obtained.

After the carbonation, the resulting suspension is filtered without any ageing treatment and the filter cake is dried to be less than 1.0 wt.% of water content and the dried mass is pulverized.

In accordance with the process of the present invention, the chain structured corpuscular calcium carbonate having an average diameter of 0.01 to 0.1μ as primary particles and an average aspect ratio of 5 to 30 can be obtained.

The chain structured corpuscular calcium carbonate obtained by the process of the invention can be used as excellent reinforcing filler for the rubber or the plastics without a surface treatment.

In order to improve the affinity to the rubber or the plastics, it is also possible to apply the surface treatment with a surfactant, etc.

The chain structured corpuscular calcium carbonate containing the chelating agent obtained by the process of the invention has the characteristics for acceleration of vulcanization whereby the amount of vulcanization-accelerator for adding the rubber can be decreased.

The process of the present invention will be further illustrated by certain examples.

EXAMPLE 1

Into 1500 wt. parts of an aqueous solution containing 1.59 wt. parts of disodium salt of ethylenediaminetetraacetic acid (2Na.EDTA), 100 wt. parts of calcium hydroxide was charged to prepare the suspension of calcium hydroxide. The calcium hydroxide was wetted by the aqueous solution and the carbonation was initiated by introducing carbon dioxide gas diluted to be 40 vol.% with nitrogen into the suspension with throughly stirring under maintaining the temperature at 19° to 21° C.

When the suspension was changed to a viscous colloidal suspension, the primary carbonation was stopped and aluminum chloride dissolved in 26 wt. parts of water was added to the suspension at a ratio of 0.03 mole of $AlCl_3$ per 1.0 mole of calcium hydroxide. After mixing aluminum chloride, carbon dioxide gas was introduced again into the suspension to initiate the secondary carbonation and the carbonation was continued to give the pH of the suspension to 7.0.

After the carbonation, the resulting suspension was filtered without any ageing treatment and the filter cake was dried and pulverized to obtain the chain structured corpuscular calcium carbonate. The result of the electron microscopic observation of the resulting chain structured corpuscular calcium carbonate is shown in Table I.

EXAMPLE 2 to 35

In accordance with the process of Example 1 except using 0.001 to 0.03 mole of various water soluble metal salts shown in Table I per 1 mole of calcium hydroxide instead of aluminum chloride, the chain structured corpuscular calcium carbonates were produced.

The results of the resulting chain structured corpuscular calcium carbonates are shown in Table I.

Table I

| Example | Chelating agent | g/100g-Ca(OH)$_2$ | Water soluble metal salt | Mol/Mol-Ca(OH)$_2$ | Chain structured corpuscular calcium carbonate Primary particle diameter (μ) | Aspect ratio |
|---|---|---|---|---|---|---|
| Example 1 | [1] 2 Na.EDTA | 1.59 | AlCl$_3$ | 0.03 | 0.023 | 21 |
| Example 2 | " | 1.59 | Li$_2$SO$_4$ | 0.001 | 0.033 | 13 |
| Example 3 | " | 1.59 | Na$_2$SO$_4$ | 0.001 | 0.026 | 17 |
| Example 4 | " | 1.59 | Na$_4$P$_2$O$_7$ | 0.03 | 0.020 | 25 |
| Example 5 | " | 1.59 | ZnCl$_2$ | 0.001 | 0.020 | 33 |
| Example 6 | " | 1.59 | ZnSO$_4$ | 0.001 | 0.033 | 19 |
| Example 7 | " | 1.59 | CdCl$_2$ | 0.03 | 0.043 | 17 |
| Example 8 | " | 1.59 | CuCl$_2$ | 0.03 | 0.015 | 34 |
| Example 9 | " | 1.59 | AgNO$_3$ | 0.03 | 0.018 | 18 |
| Example 10 | " | 1.59 | BeSO$_4$ | 0.001 | 0.015 | 10 |
| Example 11 | " | 1.59 | MgCl$_2$ | 0.001 | 0.031 | 17 |
| Example 12 | " | 1.59 | MgSO$_4$ | 0.001 | 0.027 | 32 |
| Example 13 | " | 1.59 | Sr(CH$_3$COO)$_2$ | 0.03 | 0.027 | 18 |
| Example 14 | " | 1.59 | BaCl$_2$ | 0.03 | 0.050 | 15 |
| Example 15 | " | 1.59 | LaCl$_3$ | 0.03 | 0.022 | 27 |
| Example 16 | " | 1.59 | Al$_2$(SO$_4$)$_3$ | 0.001 | 0.035 | 27 |
| Example 17 | " | 1.59 | Al(NO$_3$)$_3$ | 0.03 | 0.030 | 17 |
| Example 18 | " | 1.59 | NaAlO$_2$ | 0.03 | 0.033 | 15 |
| Example 19 | " | 1.59 | Ti(SO$_4$)$_2$ | 0.001 | 0.033 | 17 |
| Example 20 | " | 1.59 | ZrCl$_4$ | 0.03 | 0.037 | 16 |
| Example 21 | " | 1.59 | SnCl$_2$ | 0.03 | 0.022 | 15 |
| Example 22 | " | 1.59 | VCl$_3$ | 0.03 | 0.020 | 15 |
| Example 23 | " | 1.59 | NH$_4$VO$_3$ | 0.03 | 0.023 | 18 |
| Example 24 | " | 1.59 | Bi(NO$_3$)$_3$ | 0.03 | 0.033 | 21 |
| Example 25 | " | 1.59 | Na$_2$MoO$_4$ | 0.03 | 0.017 | 25 |
| Example 26 | " | 1.59 | Na$_2$WO$_4$ | 0.03 | 0.033 | 13 |
| Example 27 | " | 1.59 | SeCl$_4$ | 0.03 | 0.043 | 14 |
| Example 28 | " | 1.59 | MnCl$_2$ | 0.03 | 0.023 | 22 |
| Example 29 | " | 1.59 | FeCl$_3$ | 0.03 | 0.022 | 25 |
| Example 30 | " | 1.59 | FeSO$_4$ | 0.001 | 0.025 | 28 |
| Example 31 | " | 1.59 | CoCl$_2$ | 0.03 | 0.033 | 19 |
| Example 32 | " | 1.59 | NiCl$_2$ | 0.03 | 0.033 | 10 |
| Example 33 | " | 1.59 | PtCl$_4$ | 0.03 | 0.050 | 11 |
| Example 34 | " | 1.59 | CsHSO$_4$ | 0.001 | 0.033 | 14 |
| Example 35 | " | 1.59 | Th(NO$_3$)$_4$ | 0.03 | 0.023 | 21 |

Note [1] Disodium salt of ethylenediaminetetraacetic acid

EXAMPLES 36 to 52

In accordance with the process of Example 1 except using various chelating agents shown in Table II instead of disodium salt of ethylenediaminetetraacetic acid, the chain structured corpuscular calcium carbonates were produced.

The results of the resulting chain structured corpuscular calcium carbonates are shown in Table II.

Table II

| Example | Chelating agent | g/100g-Ca(OH)$_2$ | Water soluble metal salt | Mol/Mol-Ca(OH)$_2$ | Chain structured corpuscular calcium carbonate Primary particle diameter ($\mu$) | Aspect ratio |
|---|---|---|---|---|---|---|
| Example 36 | Maleic acid | 1.59 | AlCl$_3$ | 0.03 | 0.030 | 11 |
| Example 37 | Citric acid | 1.59 | " | 0.03 | 0.017 | 15 |
| Example 38 | Gluconic acid | 1.59 | " | 0.03 | 0.010 | 21 |
| Example 39 | Thiomalic acid | 1.59 | " | 0.03 | 0.023 | 22 |
| Example 40 | Protocatechuic acid | 1.59 | " | 0.03 | 0.022 | 16 |
| Example 41 | Pyromellitic acid | 1.59 | " | 0.03 | 0.040 | 11 |
| Example 42 | Trimellitic acid | 1.59 | " | 0.03 | 0.049 | 11 |
| Example 43 | Nitrilotriacetic acid | 1.59 | " | 0.03 | 0.023 | 6 |
| Example 44 | Hydroxyethyl ethylenediamine triacetic acid | 1.59 | " | 0.03 | 0.029 | 6 |
| Example 45 | Aspartic acid | 1.59 | " | 0.03 | 0.020 | 14 |
| Example 46 | Glutamic acid | 1.59 | " | 0.03 | 0.031 | 16 |
| Example 47 | Methyl oxine | 1.59 | " | 0.03 | 0.010 | 42 |
| Example 48 | Dimethyl glyoxine | 1.59 | " | 0.03 | 0.033 | 20 |
| Example 49 | Ascorbic acid | 1.59 | " | 0.03 | 0.022 | 17 |
| Example 50 | Sorbitol | 1.59 | " | 0.03 | 0.023 | 12 |
| Example 51 | Crotonic acid | 1.59 | " | 0.03 | 0.025 | 10 |
| Example 52 | Triethanolamine Iminodiacetic acid | 0.8 0.8 | " | 0.03 | 0.021 | 19 |

EXAMPLES 53 to 56

In accordance with the process of Example 1 except varying the amount of aluminum chloride as shown in Table III, the chain structured corpuscular calcium carbonates were produced.

The results of the chain structured corpuscular calcium carbonates are shown in Table III.

Table III

| Example | Chelating agent | g/100g-Ca(OH)$_2$ | Water soluble metal salt | Mol/Mol-Ca(OH)$_2$ | Chain structured corpuscular calcium carbonate Primary particle diameter ($\mu$) | Aspect ratio |
|---|---|---|---|---|---|---|
| Example 53 | 2 Na . EDTA | 1.59 | Aluminum chloride | 0.1 | 0.030 | 6 |
| Example 54 | " | 1.59 | " | 0.05 | 0.025 | 18 |
| Example 55 | " | 1.59 | " | 0.001 | 0.033 | 21 |
| Example 56 | " | 1.59 | " | 0.0001 | 0.033 | 21 |

EXAMPLE 57

Into an aqueous solution containing 1.59 wt. parts of disodium salt of ethylenediaminetetraacetic acid as a chelating agent and 10.1 wt. parts of aluminum chloride as water soluble metal salt (AlCl$_3$.6H$_2$O) in 1500 wt. parts of water, 100 wt. parts of calcium hydroxide was charged to prepare a suspension of calcium hydroxide.

The amount of aluminum chloride corresponded to 0.03 mole per 1.0 mole of calcium hydroxide. The calcium hydroxide was wetted by the aqueous solution and carbon dioxide gas diluted to be 40 vol.% with nitrogen was continuously introduced with throughly stirring under maintaining the temperature at 19° to 21° C. to give the pH of the slurry to 7.0.

After the carbonation, the resulting suspension was filtered without any ageing and the mass was dried and pulverized.

According to the result of the electron microscopic observation, the resulting chain structured corpuscular calcium carbonate had an average diameter of 0.027$\mu$ as primary particles and an average aspect ratio of 11.

EXAMPLE 58

In accordance with the process of Example 1 except using 15.9 wt. parts of disodium salt of ethylenediaminetetraacetic acid as the chelating agent, the chain structured corpuscular calcium carbonate was produced. According to the electron microscopic observation, the resulting chain structured corpuscular calcium carbonate had an average diameter of 0.010$\mu$ as primary particles and an average aspect ratio of 49.

COMPARATIVE EXAMPLE 1

Into 1500 wt. parts of water, 100 wt. parts of calcium hydroxide was charged without adding a chelating agent to prepare a calcium hydroxide suspension.

After calcium hydroxide was wetted to water, the carbonation was initiated by introducing carbon dioxide diluted to be 40 vol.% with nitrogen into the suspension with throughly stirring under maintaining the temperature at 19° to 21° C.

When the suspension changed to a viscous colloidal suspension, the primary carbonation was stopped and aluminum chloride, as the water soluble metal salt, dissolved in 26 wt. parts of water was added to the suspension at a ratio of 0.03 mole of $AlCl_3$ per 1.0 mole of calcium hydroxide. After mixing aluminum chloride, carbon dioxide gas diluted to be 40 vol.% with nitrogen was introduced again into the suspension to initiate the secondary carbonation and the carbonation was continued to give the pH of the suspension to 7.0.

After the carbonation, the resulting suspension was divided into two parts. One was filtered without any ageing and the filter cake was dried and pulverized.

The other was kept in ageing for 7 days and filtered and the filter cake was dried and pulverized.

According to the electron microscopic observation of the resulting both calcium carbonates, the chain structured fine carbonate was not found and only individual primary particles having cubic shape were found.

COMPARATIVE EXAMPLE 2

In accordance with the process of Comparative Example 1 except using cupric chloride, strontium chloride, stannous chloride, vanadium trichloride, chromic chloride, selenium tetrachloride, bismuth nitrate, manganous chloride, cadmium chloride, sodium aluminate or sodium pyrophosphate respectively instead of aluminum chloride, calcium carbonates were produced. In any case, a chain structured calcium carbonate was not obtained.

COMPARATIVE EXAMPLE 3

In accordance with the process of Comparative Example 1 except using zinc sulfate, zinc chloride, magnesium sulfate, aluminum sulfate, sodium sulfate, potassium sulfate or ferrous sulfate respectively instead of aluminum chloride, at a ratio of 0.001 mole per 1.0 mole of calcium hydroxide, calcium carbonates were produced.

In any case, a chain structured calcium carbonate was not obtained.

COMPARATIVE EXAMPLE 4

Into 1500 wt. parts of an aqueous solution containing 1.59 wt. parts of disodium salt of ethylenediaminetetraacetic acid as the chelating agent, 100 wt. parts of calcium hydroxide was charged to prepare a calcium hydroxide suspension. The calcium hydroxide was wetted by the aqueous solution and carbon dioxide gas diluted to be 40 vol.% with nitrogen was introduced into the suspension with throughly stirring under maintaining the temperature at 19° to 21° C. to give the pH of the suspension to 7.0.

After the carbonation, the suspension was filtered and the filter cake was dried and pulverized. In the example, the calcium carbonate was produced without using a water soluble salt.

According to the electron microscopic observation of the calcium carbonate, individual fine calcium carbonate having cubic shape was found but the chain structured calcium carbonate was not obtained.

COMPARATIVE EXAMPLE 5

In accordance with the process of Comparative Example 4 except using crotonic acid, maleic acid, fumaric acid, trimellitic acid, butyric acid, triethanolamine, iminodiacetic acid, nitrilotriacetic acid or glutamic acid respectively instead of disodium salt of ethylenediaminetetraacetic acid, the calcium carbonates were produced. In any case, the chain structured calcium carbonate was not obtained.

COMPARATIVE EXAMPLE 6

In accordance with the process of Example 1 except using 0.05 wt. part of disodium salt of ethylenediaminetetraacetic acid as the chelating agent, per 100 wt. parts of calcium hydroxide, calcium carbonate was produced. The chain structured calcium carbonate was not obtained.

COMPARATIVE EXAMPLE 7

In accordance with the process of Example 1 except using 0.000005 mole of aluminum chloride as a water soluble metal salt per 1.0 mole of calcium hydroxide, calcium carbonate was produced. As the result, individual fine calcium carbonate having cubic shape was obtained but the chain structured calcium carbonate was not obtained.

COMPARATIVE EXAMPLE 8

In accordance with the process of Example 1 except using 0.6 mole of aluminum chloride as a water soluble metal salt per 1.0 mole of calcium hydroxide, calcium carbonate was produced. As the result, the aggregated calcium carbonate having coarse particles was obtained.

COMPARATIVE EXAMPLE 9

In accordance with the process of Example 1 except using 25.1 wt. parts of disodium salt of ethylenediamine tetraacetic acid per 100 wt. parts of calcium hydroxide, calcium carbonate was produced. As the result, the primary particles of calcium carbonate were remarkably fine, however only agglomerated cake was obtained.

COMPARATIVE EXAMPLE 10

In accordance with the process of Example 1 except using 0.05 mole of potassium chloride and sodium nitrate respectively per 1 mole of calcium hydroxide instead of aluminum chloride as the water soluble metal salts which do not form water insoluble precipitate in the aqueous suspension of calcium hydroxide, calcium carbonate was produced. As the result, finely divided particles of calcium carbonate were obtained, however each case is not in the chain structure.

REFERENCE 1

The chain structured corpuscular calcium carbonate of Example 1 was blended to styrene-butadiene rubber (SBR#1502) at a ratio shown in Table IV and the mixture was vulcanized.

The characteristics of the vulcanized rubber were measured and were compared with those of the vulcanized rubber containing the conventional colloidal calcium carbonate.

The characteristics of the vulcanized rubber are shown in Table V.

As it is clear from the Table V, the chain structured corpuscular calcium carbonate obtained by the invention imparted excellent reinforcing property for the rubber.

Table IV

| | wt. parts |
|---|---|
| SBR #1502 | 100 |
| Stearic acid | 1 |
| Active zinc oxide | 3 |
| Vulcanization-accelerator DM* | 1.2 |
| Vulcanization-accelerator TS** | 0.3 |
| Sulfur | 2 |
| Calcium carbonate | 100 |

Note:
*Dibenzothiazyl disulfide
**Tetramethyl thiuram monosulfide

Table V

| Type of CaCO$_3$ | Example 1 Chain structured corpuscular CaCO$_3$ | Conventional Colloidal CaCO$_3$ |
|---|---|---|
| Tensile strength (kg/cm$^2$) | 151 | 64 |
| Tension 300% (kg/cm$^2$) | 41 | 23 |
| Elongation (%) | 650 | 510 |
| Hardness (JIS) | 64 | 63 |
| Tear strength (kg/cm) | 26 | 23 |

Vulcanizing condition 150° C.; 20 min.

REFERENCE 2

The chain structured corpuscular calcium carbonate of Example 5 was treated with rosined soap and it was blended to styrene-butadiene rubber at the ratio of Table VI and the mixture was vulcanized.

The characteristics of the vulcanized rubber were measured and were compared with those of the vulcanized rubber containing the conventional colloidal calcium carbonate treated with rosined soap.

The characteristics of the vulcanized rubber are shown in Table VII.

As it is clear from the Table, the chain structured corpuscular calcium carbonate obtained by the invention and treated with rosined soap, imparted excellent reinforcing property for the rubber.

Table VI

| | wt. parts |
|---|---|
| SBR #1502 | 100 |
| Stearic acid | 1.5 |
| Active zinc oxide | 3 |
| Vulcanization-accelerator D* | 1 |
| Vulcanization accelerator DM | 0.8 |
| Sulfur | 2 |
| Diethyleneglycol | 1 |
| Calcium carbonate | 100 |

*Diphenyl guanidine

Table VII

| Type of CaCO$_3$ | Example 5 Chain structured corpuscular CaCO$_3$ (rosined soap treatment) | Conventional Colloidal CaCO$_3$ (rosined soap treatment) |
|---|---|---|
| Tensile strength (kg/cm$^2$) | 201 | 139 |
| Tension 300% (kg/cm$^2$) | 71 | 50 |
| Elongation (%) | 750 | 600 |
| Hardness (JIS) | 68 | 69 |
| Tear strength (kg/cm) | 31 | 24 |

Vulcanizing condition 150° C; 20 min.

FIGS. 1 to 6 show electron microscopic photographs of chain structured corpuscular calcium carbonates obtained by the process of the present invention. (X: 45,000).

Figure 2:
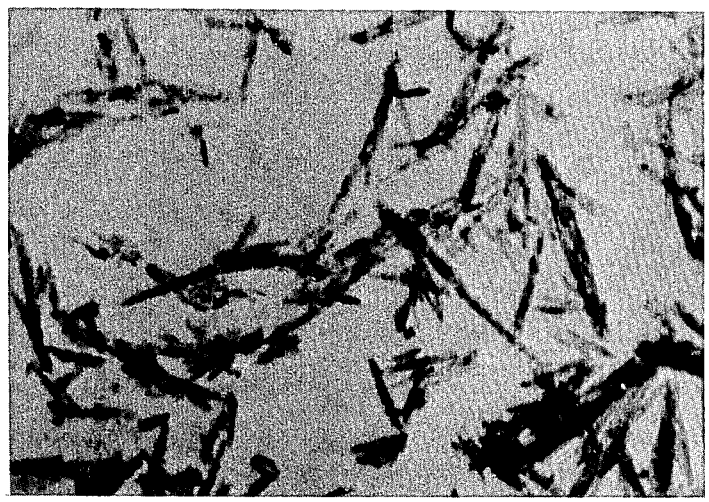
Figure 3:
Figure 4:
Figure 5:
Figure 6:

FIG. 1 shows the chain structured corpuscular CaCO$_3$ of Example 1;
FIG. 2 shows the chain structured corpuscular CaCO$_3$ of Example 5;
FIG. 3 shows the chain structured corpuscular CaCO$_3$ of Example 23;
FIG. 4 shows the chain structured corpuscular CaCO$_3$ of Example 28;
FIG. 5 shows the chain structured corpuscular CaCO$_3$ of Example 37; and
FIG. 6 shows the chain structured corpuscular CaCO$_3$ of Example 48.

What is claimed is:

1. In a process for producing chain structured corpuscular calcium carbonate, an improvement which comprises a first carbonation of calcium hydroxide in a form of an aqueous suspension containing 0.1 to 20 wt. parts of a chelating agent for CaOH per 100 wt. parts of calcium hydroxide to form a viscous colloidal suspension and a second carbonation of the resulting viscous colloidal suspension containing 0.0001 to 0.5 mole of a water soluble metal salt which forms a water insoluble precipitate in an aqueous suspension of calcium hydroxide per 1 mole of calcium hydroxide as the starting material, carrying out the carbonation to be pH of 7 to 8 at the temperature of the aqueous suspension of 0° to 30° C. during the first and second carbonations, whereby chain-structured corpuscular calcium carbonate having an aspect ratio of length to diameter of from 5 to 50 and a primary particle average diameter of 0.01 to 0.1μ is produced.

2. The process of claim 1 wherein the chelating agent is an organic compound which coordinates to a metal ion to form a metal chelate compound having multidentate ligand.

3. The process of claim 2 wherein the chelating agent is selected from the group consisting of aliphatic carboxylic acids; aliphatic oxy- or keto-carboxylic acids; aliphatic thiocarboxylic acids; aromatic carboxylic acids; aminopolycarboxylic acids, amino acids; oximes; oxines; and alkali metal salts thereof.

4. The process of claim 1 wherein the water soluble metal salt which form water insoluble precipitates in an aqueous suspension of calcium hydroxide is an alkali metal phosphate.

5. The process of claim 1, wherein the water soluble salt which forms a water insoluble precipitate in an aqueous suspension of calcium hydroxide is an alkali metal sulfate.

6. The process of claim 1, wherein the water soluble salt which forms a water insoluble precipitate in an aqueous suspension of calcium hydroxide is aluminum trichloride.

7. The process of claim 1, wherein the water soluble salt which forms a water insoluble precipitate in an aqueous suspension of calcium hydroxide is iron sulfate or iron trichloride.

8. The process of claim 1, wherein the water soluble salt which forms a water insoluble precipitate in an aqueous suspension of calcium hydroxide is magnesium or barium chloride.

* * * * *

UNITED STATES PATENT AND TRADEMARK OFFICE
CERTIFICATE OF CORRECTION

PATENT NO. : 4,157,379

DATED : June 5, 1979

INVENTOR(S) : Junji Arika Et At

It is certified that error appears in the above—identified patent and that said Letters Patent are hereby corrected as shown below:

Please insert the following priority information:

[30] -- April 16, 1976 [JP]   Japan ... 51-42412 --, as it was omitted from the Letters Patent.

Signed and Sealed this

Ninth Day of October 1979

[SEAL]

Attest:

RUTH C. MASON
Attesting Officer

LUTRELLE F. PARKER
Acting Commissioner of Patents and Trademarks